United States Patent
Novikov

(10) Patent No.: US 12,217,476 B1
(45) Date of Patent: Feb. 4, 2025

(54) DETECTION OF SYNTHETICALLY GENERATED IMAGES

(71) Applicant: Jumio Corporation, Palo Alto, CA (US)

(72) Inventor: Alexey Novikov, Quebec (CA)

(73) Assignee: Jumio Corporation, Sunnyvale, CA (US)

( * ) Notice: Subject to any disclaimer, the term of this patent is extended or adjusted under 35 U.S.C. 154(b) by 613 days.

(21) Appl. No.: 17/363,704

(22) Filed: Jun. 30, 2021

(51) Int. Cl.
  *G06T 7/00* (2017.01)
  *G06V 10/50* (2022.01)

(52) U.S. Cl.
  CPC .............. *G06V 10/507* (2022.01); *G06T 7/97* (2017.01)

(58) Field of Classification Search
  CPC ......... G06V 10/507; G06V 10/40; G06T 7/97
  See application file for complete search history.

(56) References Cited

U.S. PATENT DOCUMENTS

| | | | |
|---|---|---|---|
| 11,450,143 B2* | 9/2022 | Chang | G06V 40/1365 |
| 11,790,558 B1* | 10/2023 | Balakrishnan | G06N 20/00 |
| | | | 382/154 |
| 2003/0174859 A1* | 9/2003 | Kim | G06F 16/5838 |
| | | | 382/100 |
| 2009/0324077 A1* | 12/2009 | Wu | H04N 21/44236 |
| | | | 382/218 |
| 2016/0224853 A1* | 8/2016 | Xiong | G06V 10/54 |
| 2020/0012896 A1* | 1/2020 | Yoo | G06V 10/82 |
| 2021/0004580 A1* | 1/2021 | Sundararaman | G06V 30/224 |
| 2021/0004949 A1* | 1/2021 | Broyda | G06V 30/224 |
| 2021/0209606 A1* | 7/2021 | Herlands | G06Q 20/4016 |
| 2021/0271857 A1* | 9/2021 | Zheng | G06V 40/171 |
| 2022/0058417 A1* | 2/2022 | Kazmi | G06V 10/82 |
| 2022/0245956 A1* | 8/2022 | Kazmi | G06V 10/82 |

FOREIGN PATENT DOCUMENTS

| | | | | |
|---|---|---|---|---|
| CN | 111145146 B | * | 4/2023 | G06K 9/6256 |
| WO | WO-2017183867 A1 | * | 10/2017 | G06K 9/0004 |

* cited by examiner

Primary Examiner — Shaghayegh Azima
(74) Attorney, Agent, or Firm — Patent Law Works, LLP

(57) ABSTRACT

The disclosure includes a system and method for detecting a synthetically generated image including receiving a first image; generating, based on the first image, a first image attribute distribution; and determining, based on the first image attribute distribution, whether the first image is synthetically generated; and issuing, responsive to determining that the first image is synthetically generated, a rejection.

20 Claims, 14 Drawing Sheets

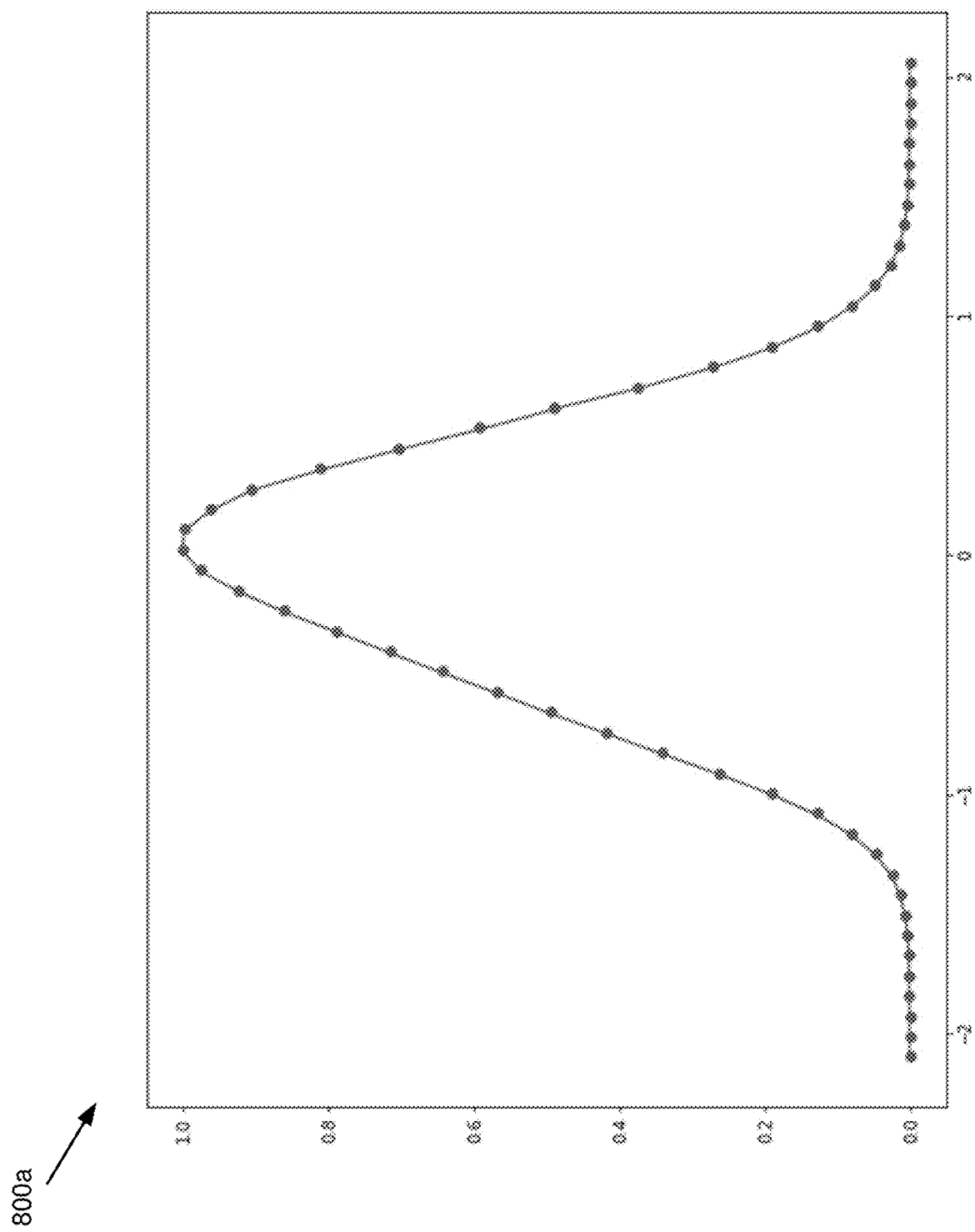

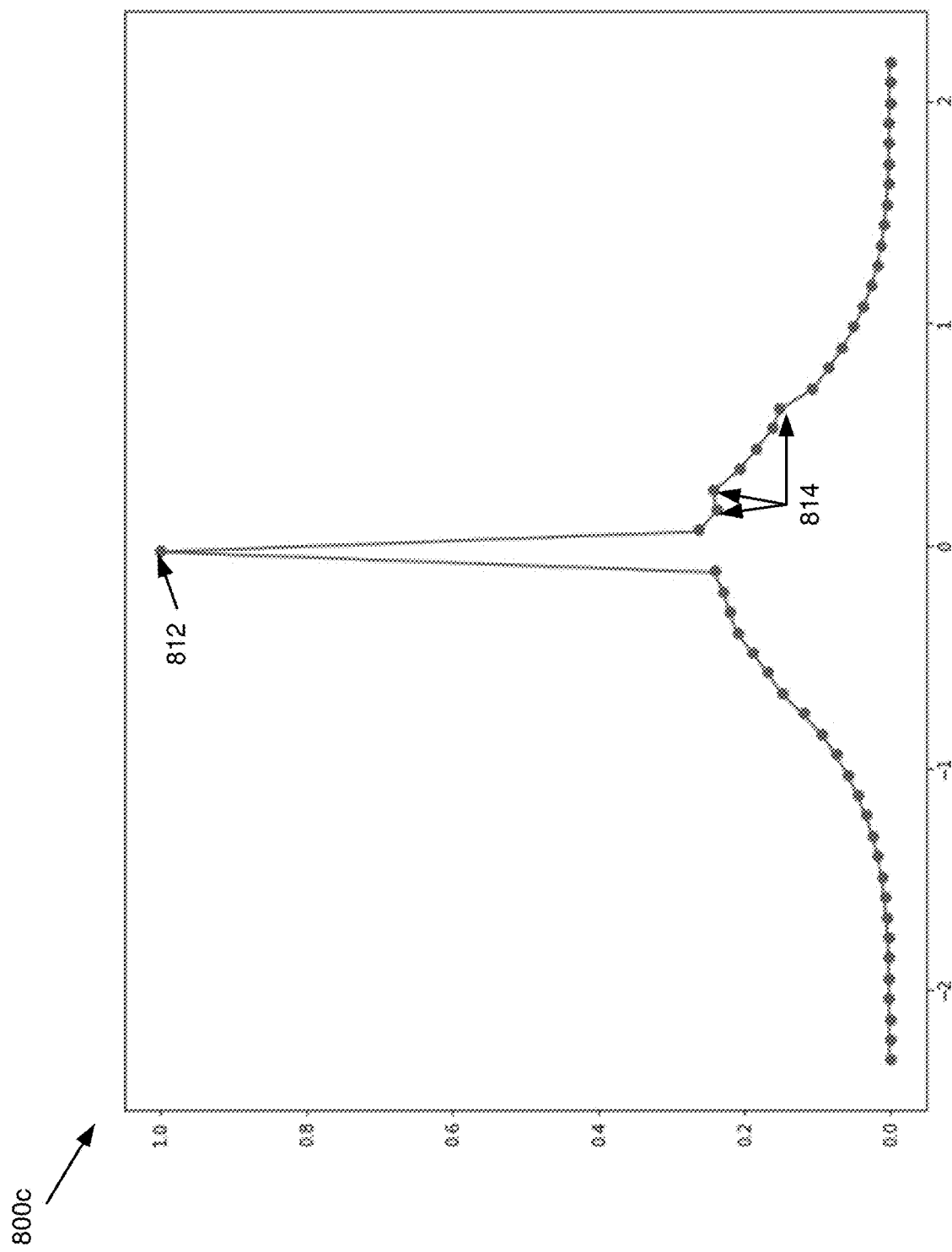

DETECTION OF SYNTHETICALLY GENERATED IMAGES

BACKGROUND

The present disclosure relates to image analysis. More specifically, the present disclosure relates to detecting synthetically generated images. Still more specifically, present disclosure relates to using the detection of synthetically generated images for identity verification.

Numerous methods and tools for editing and post processing images exist and allow users to modify images, and the methods and tools are becoming increasingly sophisticated. Magazines may use these methods and tools to make a cover model more attractive or youthful by air brushing away wrinkles or accentuating abdominal muscles. Forgers may use these methods and tools, for example, to place one individual's face on another individual's identification document, to make or alter documents, to produce images to corroborate an individual's presence when the individual was not present, or to remove an individual from an image to erase the individual's presence. A real image is an optical image formed by focusing light or other electromagnetic waves in the range onto some sort of sensor array through an optical system. A synthetically generated image or synthetic image is created by modeling the real world and simulating optics or a composition or combination of real-world images with some parts computer generated.

SUMMARY

This specification relates to methods and systems for detecting synthetically generated images. According to one aspect of the subject matter described in this disclosure, a method of detecting synthetically generated images includes receiving a first image; generating, based on the first image, a first image attribute distribution; and determining, based on the first image attribute distribution, whether the first image is synthetically generated; and issuing, responsive to determining that the first image is synthetically generated, a rejection.

Other implementations of one or more of these aspects include corresponding systems, apparatus, and computer programs, configured to perform the actions of the methods, encoded on computer storage devices.

These and other implementations may each optionally include one or more of the following features. For instance, the first image attribute distribution includes a mean-subtracted contrast normalized coefficient distribution, and determining whether the first image is synthetically generated includes applying a normality test to determine whether the mean-subtracted contrast normalized coefficient distribution is normal. The first image attribute distribution includes a color histogram, and determining whether the first image is synthetically generated applies a machine learning algorithm to determine whether an anomaly is present in the color histogram. For instance, the features include determining whether the first image is synthetically generated, includes applying a machine learning algorithm. For instance, the features include determining whether the first image is synthetically generated, includes determining whether the first image is partially synthetic or fully synthetic. For instance, the features include determining, based on the first image attribute distribution, that the first image is synthetically generated; receiving a second image, wherein the second image is a component of the first image; generating, based on the second image, a second image attribute distribution; and determining, based on the second image attribute distribution, whether the second image is synthetically generated. For instance, the features include receiving a third image that is another component of the first image; generating, based on the third image, a third image attribute distribution; and determining, based on the third image attribute distribution, whether the third image is synthetically generated. For instance, the features include the first image is a first image component of a larger image, and receiving a second image, where the second image is a second image component of the larger image; generating, based on the second image, a second image attribute distribution; and determining, based on the second image attribute distribution, whether the second image is synthetically generated. The first image is a component of a larger image, and the first image includes an area of interest within the larger image and a margin beyond the area of interest in one or more dimensions. The rejection triggers one or more of a failure of identity confirmation and failure of authentication.

BRIEF DESCRIPTION OF THE DRAWINGS

The disclosure is illustrated by way of example, and not by way of limitation in the figures of the accompanying drawings in which like reference numerals are used to refer to similar elements.

FIG. 8A-C illustrate examples of mean-subtracted contrast normalized coefficient distributions generated from a non-synthetic, a partially synthetic, and a synthetic image, respectively, in accordance with some implementations.

DETAILED DESCRIPTION

Figure 1:
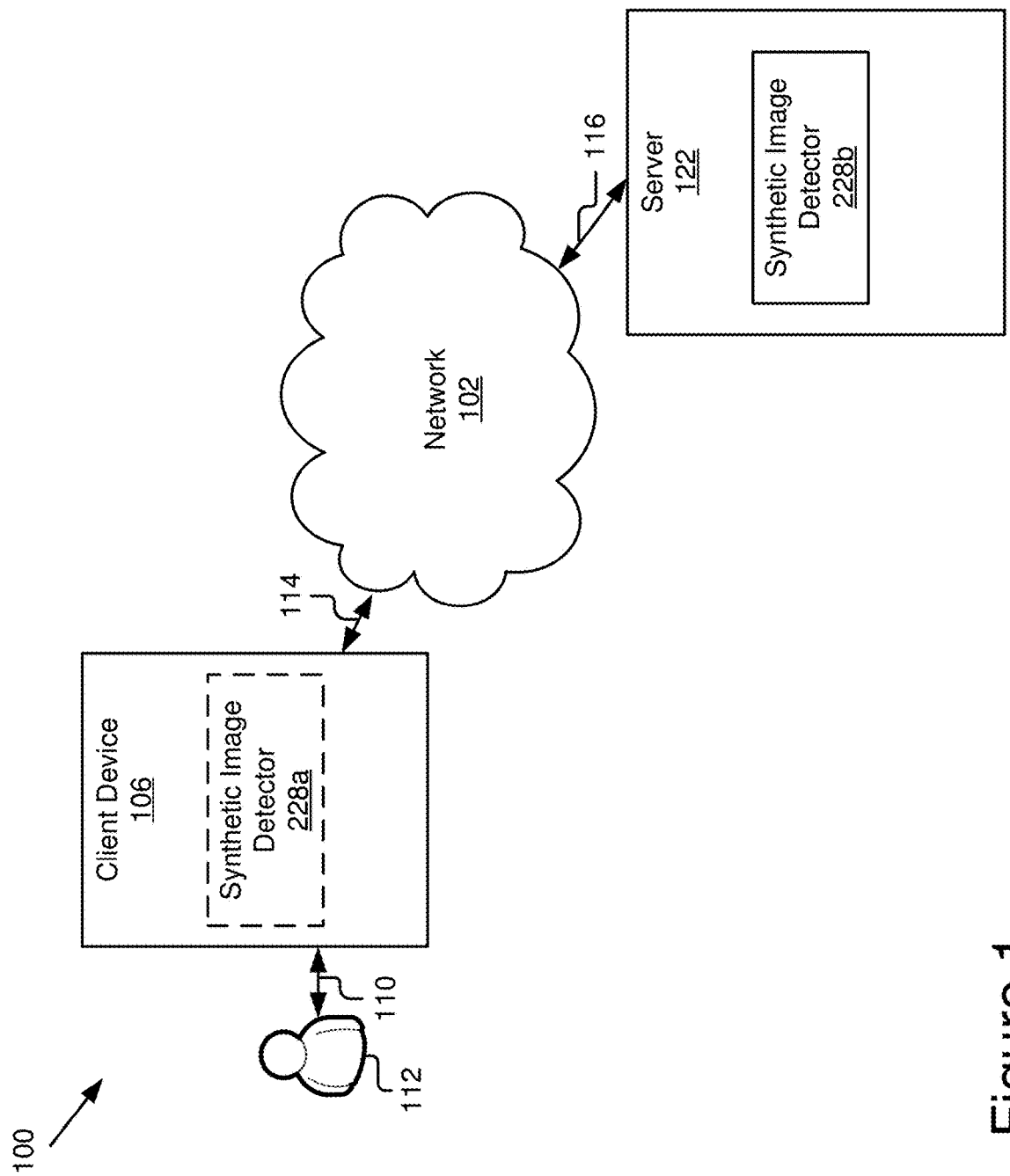
FIG. 1 is a block diagram of one example system for synthetic image detection in accordance with some implementations.

Entities, such as governments, businesses, and individuals, may seek to verify an identity of a person for any number of reasons including: to protect information or digital assets (e.g., bank accounts, password manager accounts, etc.), to protect physical assets (e.g., doors, vaults, borders, etc.), to comply with laws and regulations (e.g., sanctions, anti-money laundering or other banking regulations), or other reasons. To confirm an identity, a comparison is often made between an attribute (e.g., face) of the person present and a reference documentation associated with that attribute (e.g., photo ID showing the person's face).

To confirm an identity, a comparison may be made between an attribute (e.g., a biometric such as a signature, voice, face, retina, palm print, fingerprint, etc.) of the person present and a reference documentation associated with that attribute (e.g., copy of the person's signature, recording of the person's voice, photo ID showing the person's face, scan data of the user's retina, palm, finger(s), etc., respectively). For example, a user wishing to establish his/her identity with an entity, e.g., a government agency or a commercial enterprise, may be asked to submit an image during the identity establishment process through the entity's application on his/her mobile phone or through the entity's portal on a web browser. The entity may, depending on the implementation, check that the image thus taken matches the photo on an identification document that the user has submitted in order to verify the person's identity, store the image for later identification purposes, or do both.

Recent technology improvements and tools have made it easier for users to generate synthetic images. For example, the tools and methods for image manipulation are becoming increasingly sophisticated. Technologies such as digital image editors, deep fake video software, Internet image searches, and others may allow even novice users to generate synthetic images, that are difficult, or even impossible, for the human eye to distinguish as synthetic.

A fraudster looking to mislead the entity as to his or her identity may compromise the integrity of the identity confirmation process by generating and providing a synthetic image. For example, the fraudster may provide a synthetic image of an identification document to be used as the reference document. For example, the fraudster may use Google's image search to find an image of an identification document such as a Driver's License (perhaps from the Department of Motor Vehicles own website), download the image, and use a digital image editor, such as Photoshop, to place an image of the fraudster's face in the designated area, and supply or modify text in the various fields of the Driver's License, and save the fake ID as an image. As another example, the fraudster may take a photo of a valid Driver's License (perhaps stolen from the person to whom it was issued), use a digital image editor, such as Photoshop, to replace the face with that of the fraudster, and save the modified image.

As transactions are increasingly remote or electronic, technical challenges, which may not be present when a person physically presents reference documentation in the physical world, arise. Identification documentation, is increasingly provided electronically, for example, by taking an image of the documentation, and less frequently provided physically. Therefore, many of the physical attributes an authentic Driver's License may have (e.g., thickness, weight, texture, rigidity, watermark, hologram, RFID or another chip, lamination, etc.) are ineffective, or less effective, at preventing forgery or demonstrating authenticity. For example, to establish a reference document, assume an entity prompts the user to provide a picture of his or her government issued identification, the fraudster may provide a synthetically generated image of a Driver's License described above in response without having to physically make a fake ID card.

As transactions are increasingly remote or electronic, additional technical challenges, which may not be present when a person physically presents himself/herself in the physical world for comparison arise. For example, a fraudster may provide a synthetic image for comparison to the reference document. For example, assume video of the user is used for comparison to the reference documentation, a fraudster may generate a deep fake video of legitimate user and point the camera that video.

Moreover, fraudsters may leverage technology to automate a series of repeated, fraudulent attempts to mislead an entity until a successful vector of attack is discovered.

The synthetic image detector described herein may beneficially detect such fraudulent occurrences by determining whether an image is synthetically generated.

The present disclosure is described in the context of an example synthetic image detector and use cases; however, those skilled in the art should recognize that the synthetic image detector may be applied to other environments and use cases without departing from the disclosure herein. For example, this disclosure references example use cases involving user identification and detecting synthetically generated images of an identification document, such as a passport, a government identification, a student identification, a driver's license, a voting identification, an employee identification, a membership identification, a birth certificate, and a social security card. However, it should be recognized that other images and use cases exist and are within the present disclosure. For example, the image may include a photograph or video purporting to corroborate the presence (or absence) of an individual at the scene of a crime, and the synthetic image check may determine whether the image is synthetic, thereby authenticating the image. As another example, the image may include a photograph of a receipt submitted for reimbursement, and the synthetic image check may determine whether the image is synthetic (e.g., the amount has been increased or the date altered on the receipt), thereby authenticating the image.

FIG. 1 is a block diagram of an example system 100 for synthetic image detection in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102, as illustrated by signal line 114, and may be accessed by a user 112 as illustrated by line 110. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

In some implementations, the user 112 is a human user and occasionally referred to herein as person, individual, or similar.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may optionally (as indicated by the dashed lines) include an instance of the synthetic image detector 228a and the server 122 may include an instance of the synthetic image detector 228b. However, in some implementations, the components and functionality of the synthetic image detector 228 may be entirely client-side (i.e., at 228a), entirely server side (i.e., at 228b), or divide among the client device 106 and server 122 (i.e., divided across 228a and 228b).

Figure 2:
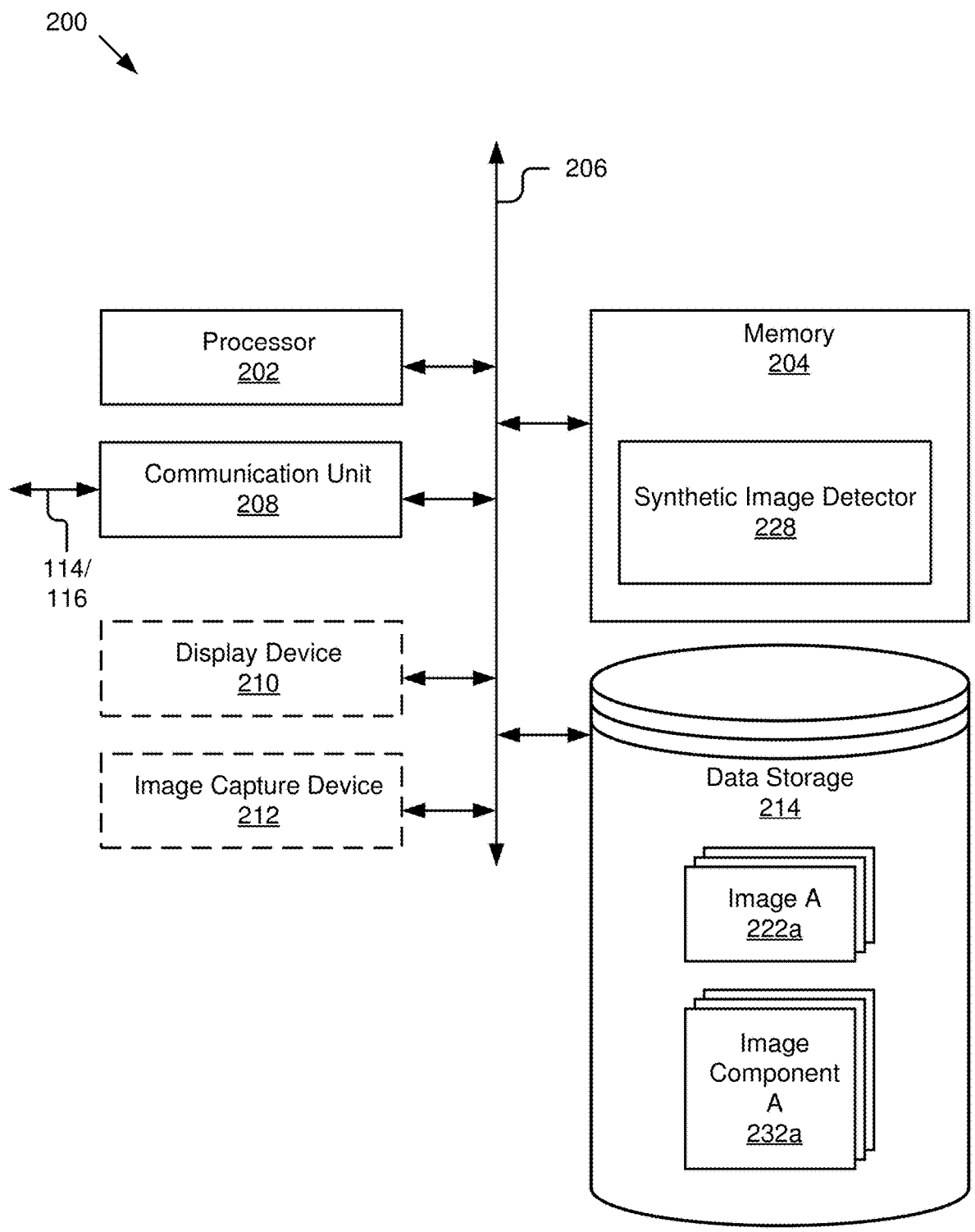
FIG. 2 is a block diagram of an example computing device in accordance with some implementations.

FIG. 2 is a block diagram of an example computing device 200 including an instance of the synthetic image detector 228. In the illustrated example, the example the computing device 200 includes a processor 202, a memory 204, a communication unit 208, a display device 210, an image capture device 212, and a data storage 214. In one implementation, the computing device 200 is a client device 106, the memory 204 stores the synthetic image detector 228a, and the communication unit 208 is communicatively coupled to the network via signal line 114. In another implementation, the computing device 200 is a server 122, the memory 204 stores the synthetic image detector 228b, and the communication unit 208 is communicatively coupled to the network via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the synthetic image detector 228. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The memory stores the synthetic image detector 228. The synthetic image detector 228 may include software and/or logic for processing data and performing detection of synthetic images. The synthetic image detector 228 is coupled to operate in conjunction with the processor 202 to receive images, determine whether they are synthetic and in response signal other components of the system 100 to perform additional processing.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 210 is a conventional type such as a liquid crystal display (LCD), light emitting diode (LED), touchscreen, or any other similarly equipped display device, screen, or monitor. The display device 210 represents any device equipped to display electronic images and data as described herein.

The image capture device 212 is device for capturing images. The images may be stills, video images, or both depending on the implementation. In some implementations, the image capture device is a camera, for example, a digital single lens reflex (DSLR) camera, a mobile phone camera, a digital camera, a compact mirrorless camera or other camera.

The data storage 214 is a non-transitory memory that stores data for providing the functionality described herein. The data storage 214 may include one or more non-transitory computer-readable mediums for storing the data. In some implementations, the data storage 214 may be incorporated with the memory 204 or may be distinct therefrom. The data storage 214 may be a dynamic random-access memory (DRAM) device, a static random-access memory (SRAM) device, flash memory, or some other memory devices. In some implementations, the data storage 214 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 214 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The data storage 214 is communicatively coupled to the bus 206. The data storage 214 may store, among other data, one or more images, e.g., illustrated as Image A 222, one or more image components, e.g., illustrated as image component A 232a, one or more image attribute representations (not shown), and one or more machine learning models, or algorithms (not shown).

It should be apparent to one skilled in the art that other processors, operating systems, inputs (e.g., keyboard, mouse, one or more sensors, microphone, etc.), outputs (e.g., a speaker, display, haptic motor, etc.), and physical configurations are possible and within the scope of the disclosure.

Figure 3:
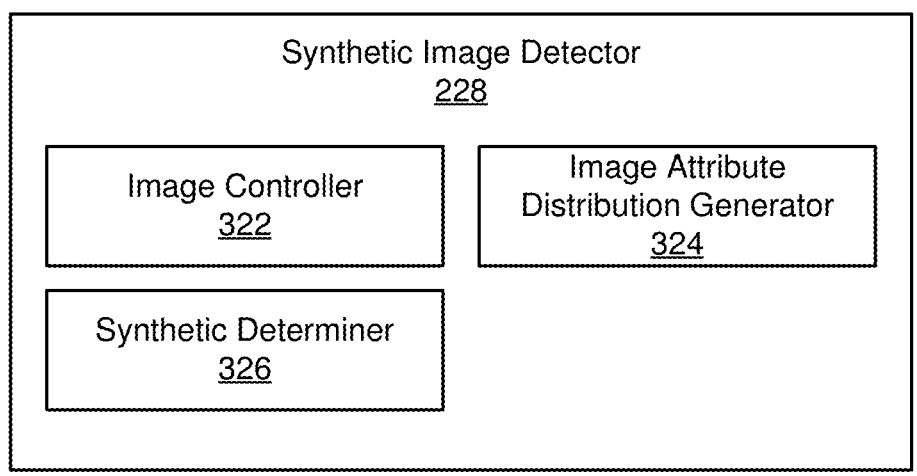
FIG. 3 is a block diagram of an example synthetic image detector in accordance with some implementations.

Referring now to FIG. 3, a block diagram of an example synthetic image detector 228 is illustrated in accordance with one implementation. As illustrated in FIG. 3, the synthetic image detector 228 may include an image controller 322, an image attribute distribution generator 324, and a synthetic determiner 326.

The image controller 322 may include software and/or logic for processing a request to check that an image is synthetic and controlling other components of the synthetic image detector 228 to perform the check. The image controller 322 determines the image to be analyzed to determine whether the image is synthetic, and makes available the image to the image attribute distribution generator 324. Depending on the implementation and the use case, the image determined may include a full image or a component of a larger (e.g., a full) image. The image controller 322 is coupled to receive a request to check that an image is synthetic, and is coupled to the image attribute distribution generator 324 to provide an image for processing.

Depending on the implementation, execution of the image controller 322 may be triggered by one or more events. Examples of events that may trigger the image controller 322 to execute include, but are not limited to, one or more of receipt of a synthetic image check request, and a component check request from the synthetic determiner 326. The image controller 322 is communicatively coupled to receive the triggers. For example, the image controller 322 is communicatively coupled to an image capture device 212 receive a trigger (e.g., the trigger may include receiving a photograph or video from a camera). In another example, the image controller 322 is communicatively coupled to an application (not shown) that verifies an identity to receive a trigger (e.g., a banking application seeking to verify that a provided image of a customer being onboarded or requesting login has not been synthetically generated sends a synthetic image request). In another example, the image controller 322 is communicatively coupled to an application (not shown) that verifies authenticity (e.g., an accounting application seeking to check that an image of a provided receipt being submitted for reimbursement has not been synthetically generated, or a forensics application seeking to verify the authenticity of a provided photo or video). In yet another example, the image controller 322 is communicatively coupled to the synthetic determiner to receive a component check request from the synthetic determiner 326 responsive a determination that a full (or larger) image failed the image synthetic check.

In some implementations, the image controller 322 determines the image to be analyzed based on a synthetic image check request. In some implementations, the synthetic image check request includes an image, and the image controller 322 determines that the image included in the synthetic image check request is to be analyzed. In some implementations, the synthetic image check request includes an image identifier, such as a pointer, file name, file path, URI, URL, or other information associated with an image. In these implementations, the image controller 322 retrieves the image using the image identifier and provides the image to the image attribute distribution generator 324. The image controller 322 is coupled to communication unit 208 to retrieve the image using the image identifier over the network 102 or from the data store 214.

In some implementations, the image controller 322 determines the image based on receipt of a request from the synthetic determiner 326. In some implementations, the synthetic determiner 326 may send a request to the image controller 322 to determine a next image in a sequence of images for analysis. In another example, the synthetic determiner 326 may analyze an image and determine that one or more components of the image may need additional processing and may send a component request to have the image controller 322 retrieve those components that need additional processing from the data storage 214. Such component request may include any number of requests for additional components and may be requested in serial or parallel. The image controller 322 is coupled to the synthetic determiner 326 to receive additional image or component requests.

In some implementations, the image controller 322 generates one or more image components and determines the image to be analyzed is an image component generated by the image controller 322. An image component is a portion of a greater image, i.e., less than the entirety of the image. Depending on the implementation, the portion may be an area of interest within the image (e.g., where the photo of a face appears on a photo ID) or a subset of information (e.g., only contrast, or a subset of one or two selected from the set of three, i.e., Red, Green, Blue, color values for the image). In some implementations, components rather than the entire image are analyzed by the synthetic image detector 228.

In some implementations, the image controller 322 generates one or more image components automatically. Generation of the one or more image components may vary depending on one or more of the implementations, use case, and image subject matter. In some implementations, the one or more image components is generated based on one or more of a predefined area, a template (e.g., a passport template for a particular country, a driver's license template for a particular jurisdiction, etc.), an analysis of areas most commonly changed (e.g., based on the components identified most frequently as synthetic by the synthetic determiner 326 in an earlier period of time or other statistics), and areas around those commonly changed areas. For example, in some implementations, when an image is received, e.g., an image of a photo ID, the image controller 322 automatically generates one or more components of the image based on area(s) of interest, e.g., the photo in the photo ID and one or more fields on the photo ID, and determines one or more of those components is the image to be analyzed.

In some implementations, the image controller 322 generates one or more image components, and determines the image to be analyzed is an image component based on a component check request received from the synthetic determiner 326. For example, when an image, e.g., including an image of a photo ID, is detected as being synthetically generated; in some implementations, the image controller 322 generates one or more components of the image, e.g., associated with the photo in the photo ID and one or more fields on the photo ID, and determines one or more of those components is the image to be analyzed.

In some implementations, the image controller 322 determines a component based on an area of interest. The areas of interest may be determined using a variety of methods depending on the implementation. Examples of methods for determining areas of interest include, but are not limited to, forms, rules, optical character recognition, etc. In some implementations, an area of interest is associated with subject matter. For example, in one implementation, the image controller 322 may determine that the image includes a photo ID, and, depending on the implementation, the type of photo ID (e.g., Driver's License Issued between 2002 and 2019, and determine the areas of interest are the photo, and the various fields on the ID, such as license number, date of birth, address, age, weight, height, gender, expirations date, issue date, etc.

In some implementations, the image controller 322 determines a component based on an area of interest and includes a margin beyond the area of interest in at least one dimension. For example, assume the area of interest is the expiration date of an ID, and the expiration date field is located in a box on the ID. Also assume that a fraudster has altered the expiration date by clipping the area within the box from another image of a photo ID with the desired expiration date and placing the desired expiration date and in the box of the image, thereby generating a composite image. Also assume the component is 1.1 times the height of the area of interest and 1.1. times the width of the area of interest with the area of interest centered in the component, so the component includes the expiration date box and an area around the expiration data box. In implementations that perform a component-based synthetic check without a full image synthetic check, the synthetic image detector 228 may detect the component as synthetic in the above-described example, as the component represents a composite of two images. In implementations that perform a component-based synthetic check and a full image synthetic check, the synthetic image detector 228 may detect that the full image is synthetically generated and detect the component as synthetic, in the above-described example, as the component represents a composite of two images.

The margin may vary based on the implementation and use case. For example, the dimensions of the margin may vary. For example, the margin may be a predetermined size, such as a predefined number of pixels (e.g., 100) in some implementations, and a predetermined ratio or factor based on a dimension of the area of interest (e.g., an area 20% larger than the area of interest, 1.3 times the height of the area of interest) in some implementations, etc. As another example, the margin may relate to the area of interest differently, e.g., extend only in one vertical direction (up or down), extend only in one horizontal direction (left or right), or center the area of interest, center the area of interest but no margin where the margin extends beyond the edge of the full image, etc.

In some implementations, the image controller 322 determines a component based on an edge in the image. For example, the image controller 322 determines a component that spans an edge in an image. Referring again to the above example in which a fraudster has altered the expiration date within the box using another image, thereby generating a composite image. In some implementations, the image controller 322 determines a component that spans an edge of the expiration data box and includes a portion of the image inside the edge of the box and a portion of the image outside the edge of the box. In implementations that perform a component-based synthetic check without a full image synthetic check, the synthetic image detector 228 may detect the component as synthetic in the above-described example, as the component represents a composite of two images. In implementations that perform a component-based synthetic check and a full image synthetic check, the synthetic image detector 228 may detect that the full image is synthetically generated and detect the component as synthetic, in the above-described example, as the component represents a composite of two images.

In some implementations, the image controller 322 makes the selected image available by sending the image to the image attribute distribution generator 324. In some implementations, image controller 322 makes the selected image available by storing the image for retrieval by the image attribute distribution generator 324. For example, referring to FIG. 2, the image controller 322 stores an image A 222*a* and/or one or more image components 232 of image A 222*a* in the data storage 214.

The image attribute distribution generator 324 may include software and/or logic for generating an image attribute distribution for a selected image, which may be used by the synthetic determiner 326 to determine whether the selected image was synthetically generated. The image attribute distribution generator 324 obtains the image selected by the image controller 322 and generates an image attribute distribution. In some implementations, the image attribute distribution generator 324 obtains the image by receiving the image from the image controller 322. In some implementations, the image attribute distribution generator 324 obtains the image by retrieving the image from storage, e.g., memory 204 or data storage 214. The image attribute distribution generator 324 is coupled to the image controller 322 to receive a request including, or identifying, an image to be checked for synthetic generation, and is coupled to the synthetic determiner 326 to provide an image attribute distribution of the image to be checked for synthetic generation for analysis.

Depending on the implementation and use case, one or more attributes are used to generate a distribution for a selected image. The number of distributions generated from the selected image, and the type(s) of distribution(s) generated may vary depending on the implementation and use case. In some implementations, the type and number of distributions are defaults. In some implementations, the type and number of distributions are non-modifiable, for example, the type and number of distributions are hard coded. In some embodiments, the type or number of distributions may be modified (e.g., from a default) based on a user selection or by the system 100, and the modification may be based on one or more of a use case, an application (not shown) that is requesting the synthetic image check, a type of image, a subject matter of an image, or other factors. In some implementations, the image attribute distribution generator 324 is communicatively coupled to receive an indication of the type and number of distributions from one or more of a user 112 (e.g., via client device 106) or an application (not shown), such as an application that performs an identification or an authentication.

The image attribute used by the image attribute distribution generator 324 to generate an image attribute distribution may vary depending on the implementation and the use case. Examples of image attributes include, but are not limited to, attributes present in the image data color, intensity, contrast, brightness, and attributes calculated therefrom, for example, mean-subtracted normalized contrast (MSCN) coefficients.

The distribution generated by the image attribute distribution generator 324 may vary depending on the implementation and the use case. In some implementations, the image attribute distribution generator 324 uses color information and generates color histograms. For example, in some implementations, the image attribute distribution generator 324 and the image use the RGB (red, green, and blue) color model and generates three distributions-a color histogram for red, a color histogram for green, and a color histogram for blue. For example, FIGS. 6A-C and 7A-C illustrated example distributions generated by the image attribute distribution generator 324 from six different images. In each of the FIGS. 6A-C and 7A-C, the red, green, and blue color histograms are plotted on the same set of axes, where the X axis is associated with a color value range, and the Y axis is associated with a number of pixels having that value. Therefore, a point on the red color histogram shows how many pixels (Y) have a particular red value (X), a point on the green color histogram shows how many pixels (Y) have a particular green value (X), and a point on the blue color histogram shows how many pixels (Y) have a particular blue value (X). It should be recognized that, while the above example refers to the RGB color model for clarity and convenience, other color models, such as cyan, magenta, yellow, black (CMYK); hue, saturation, lightness (HSL), hue, saturation, brightness (HSB), exist and the use of other color models is within the scope of this disclosure.

Figure 8B:
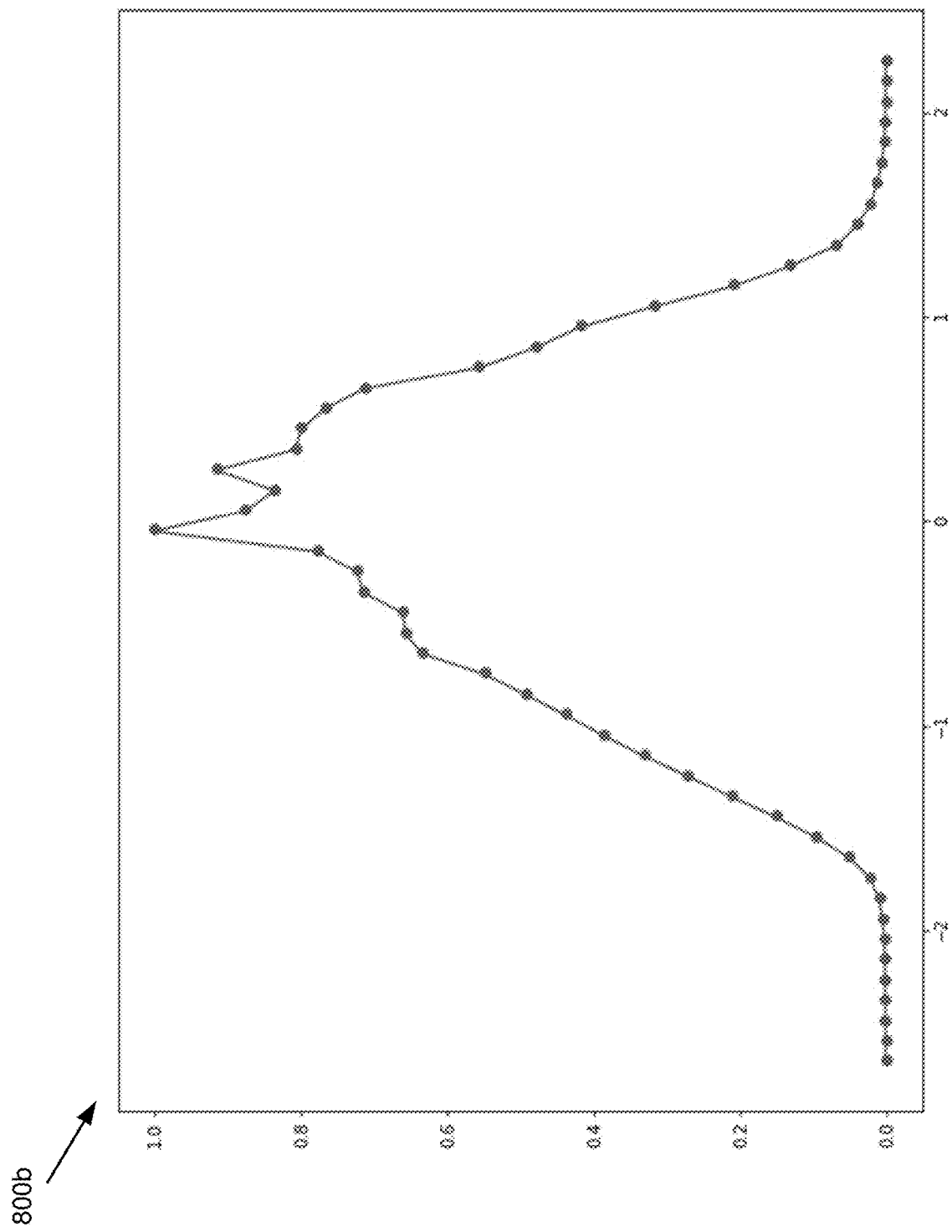

In some implementations, the image attribute distribution generator 324 calculates an image attribute from image data and uses the calculated image attribute to generate an image attribute distribution. For example, in one implementation, the image attribute distribution generator 324 calculates a set of mean-standard contrast normalized MSCN coefficients and plots the MSCN coefficients to generate the attribute distribution. For example, FIG. 8A-C illustrated example distributions generated by the image attribute distribution generator 324 from three different images. In each of the FIGS. 8A-C the MSCN coefficients are plotted, where the X axis is associated with values of MSCN coefficients, and the Y axis is associated with frequency.

In some implementations, the image attribute distribution generator 324 makes the image attribute distribution available to the synthetic determiner 326 by sending the image attribute distribution to the synthetic determiner 326. In some implementations, image attribute distribution generator 324 makes the image attribute distribution available to the synthetic determiner 326 by storing the image attribute distribution for retrieval by the synthetic determiner 326. For example, the image attribute distribution generator 324 stores image attribute distribution in the data storage 214 or memory 204 of FIG. 2.

The synthetic determiner 326 may include software and/or logic for processing an image attribute distribution to determine whether an image represented by the image attribute distribution is synthetically generated. The synthetic determiner 326 obtains an image attribute distribution, and determines whether the image represented by the image attribute distribution is synthetic based on the image attribute distribution.

The synthetic determiner 326 is communicatively coupled to one or more of the image attribute distribution generator 324, memory 204, and data storage 214a to obtain an image attribute distribution. In some implementations, the synthetic determiner 326 obtains the image attribute distribution by receiving the image attribute distribution from the image attribute distribution generator 324. In some implementations, the synthetic determiner 326 obtains the image attribute distribution by retrieving the image attribute distribution from storage, e.g., memory 204 or data storage 214.

The synthetic determiner 326 may perform different analysis to determine whether an image attribute distribution is associated with, or derived from, a synthetically generated image depending on one or more of the implementations, the use case, and type of image attribute distribution (e.g., color histogram, MSCN coefficient plot, etc.).

For clarity and convenience, the synthetic determiner 326 analysis is described below with describes an example implementation in which the image attribute distribution includes RGB color histograms, with reference to FIGS. 6A-7C, and an example implementation in which the image attribute distribution includes a MSCN coefficient plot, with reference to FIG. 8A-C. With reference to FIGS. 6A-7C, the red color histogram is illustrated using a solid line, the green color histogram is illustrated using a dotted line, and the blue color histogram illustrated using a dashed line.

Figure 6A:
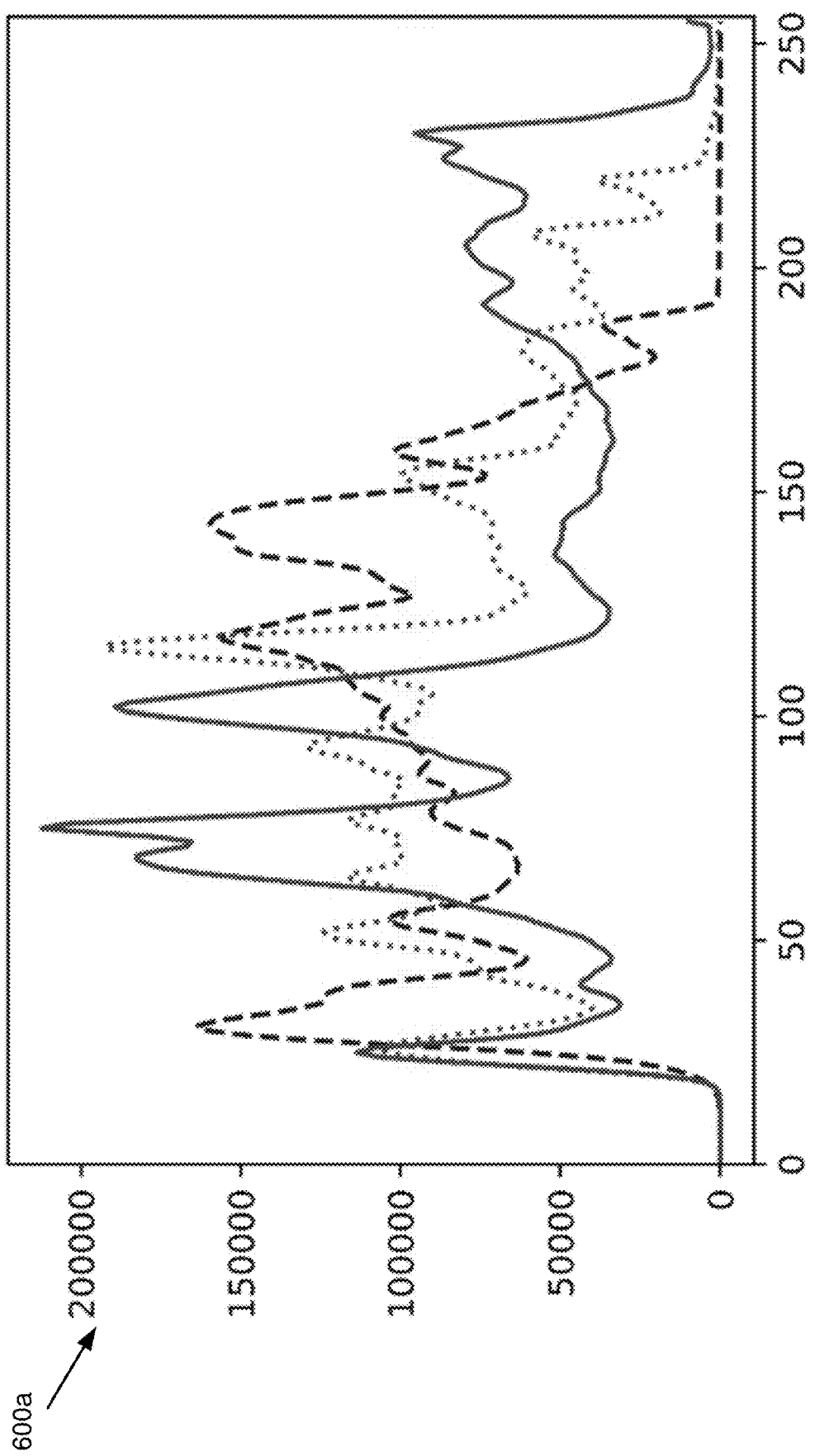
FIGS. 6A-C illustrate example color histograms generated from different non-synthetic images in accordance with some implementations.
Figure 6B:
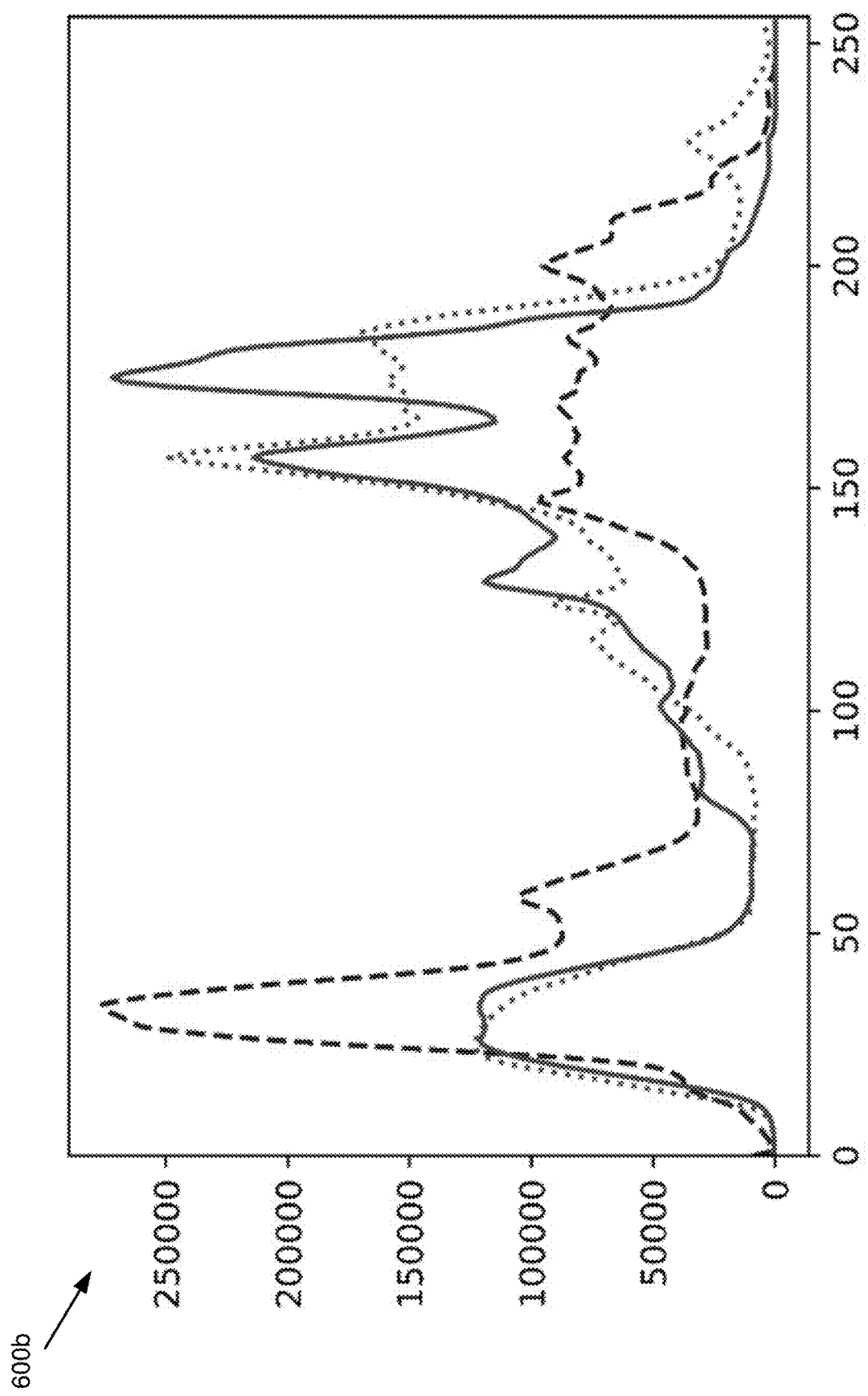
Figure 6C:
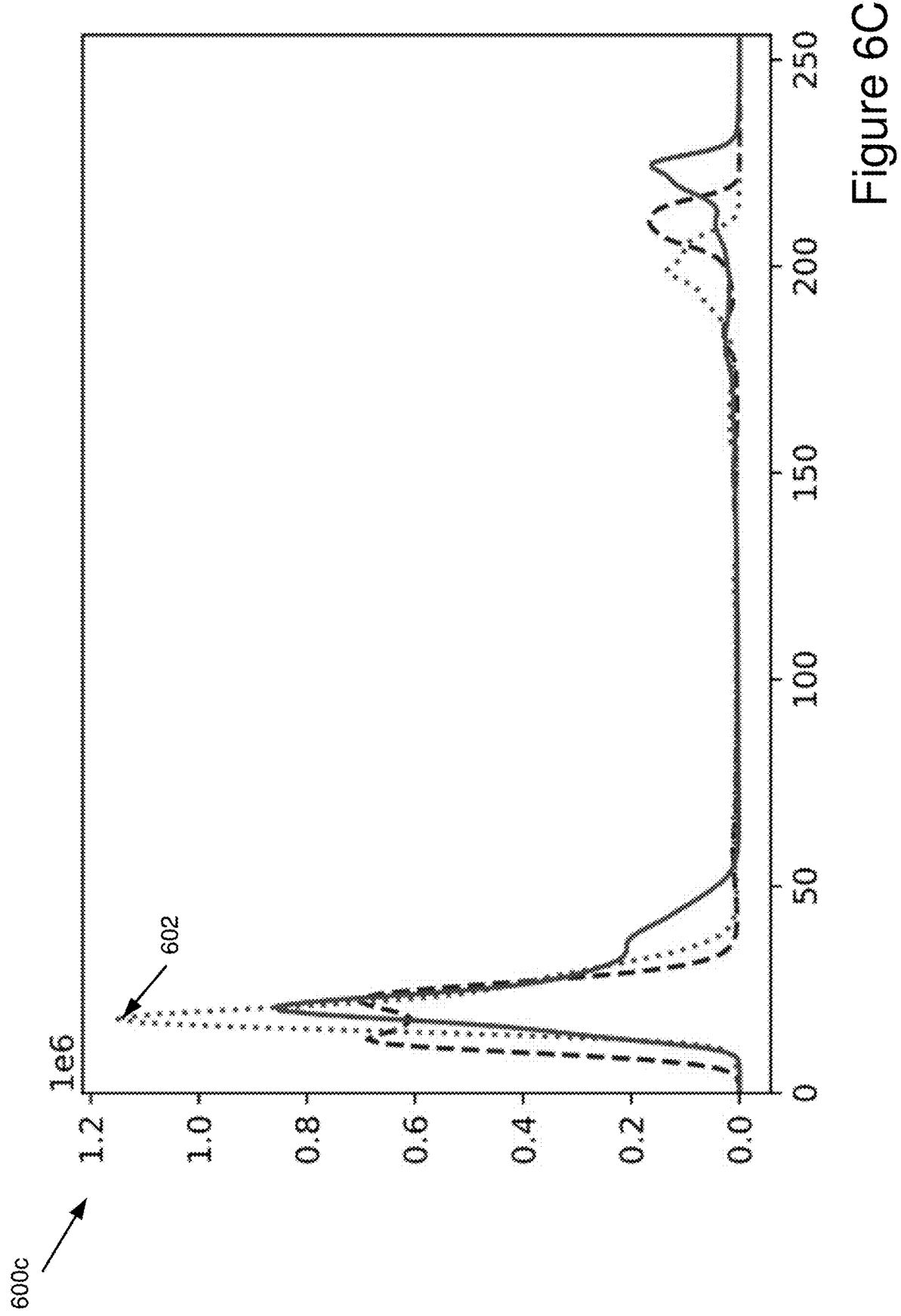

FIGS. 6A-C illustrate example RGB color histograms 600a-c generated from three different non-synthetic images (not shown) in accordance with some implementations. Upon review of FIGS. 6A-C, certain characteristics are graphically apparent. For example, the histograms 600a-c are irregular, or non-periodic, peaks exist, but peaks have width and a slope to the zenith. The slope may be steep, as depicted by the green peak 602 in FIG. 6C, but the peaks do not appear asymptotic or near asymptotic.

Figure 7A:
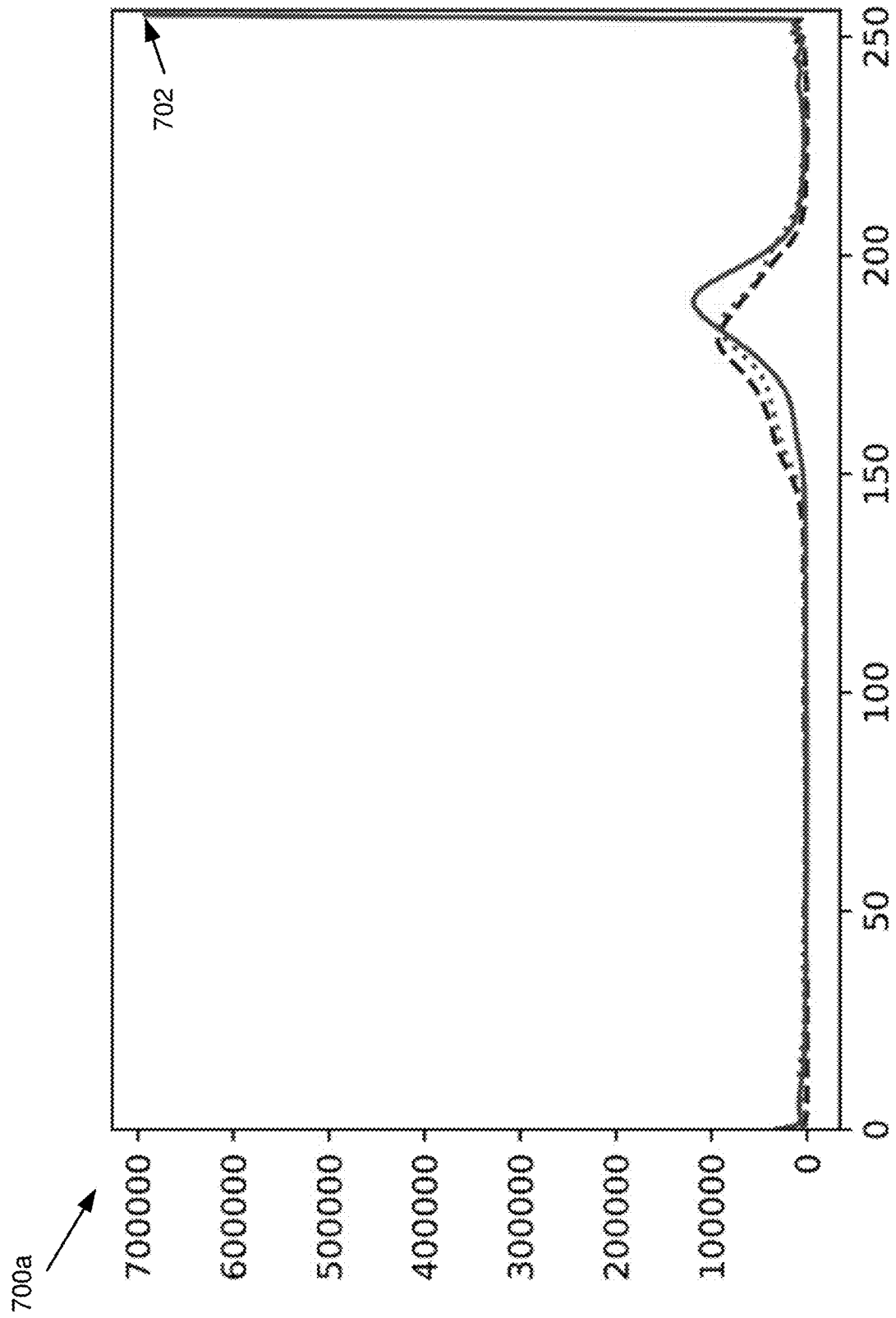
FIG. 7A-C illustrate example color histograms generated from different synthetic images in accordance with some implementations.
Figure 7B:
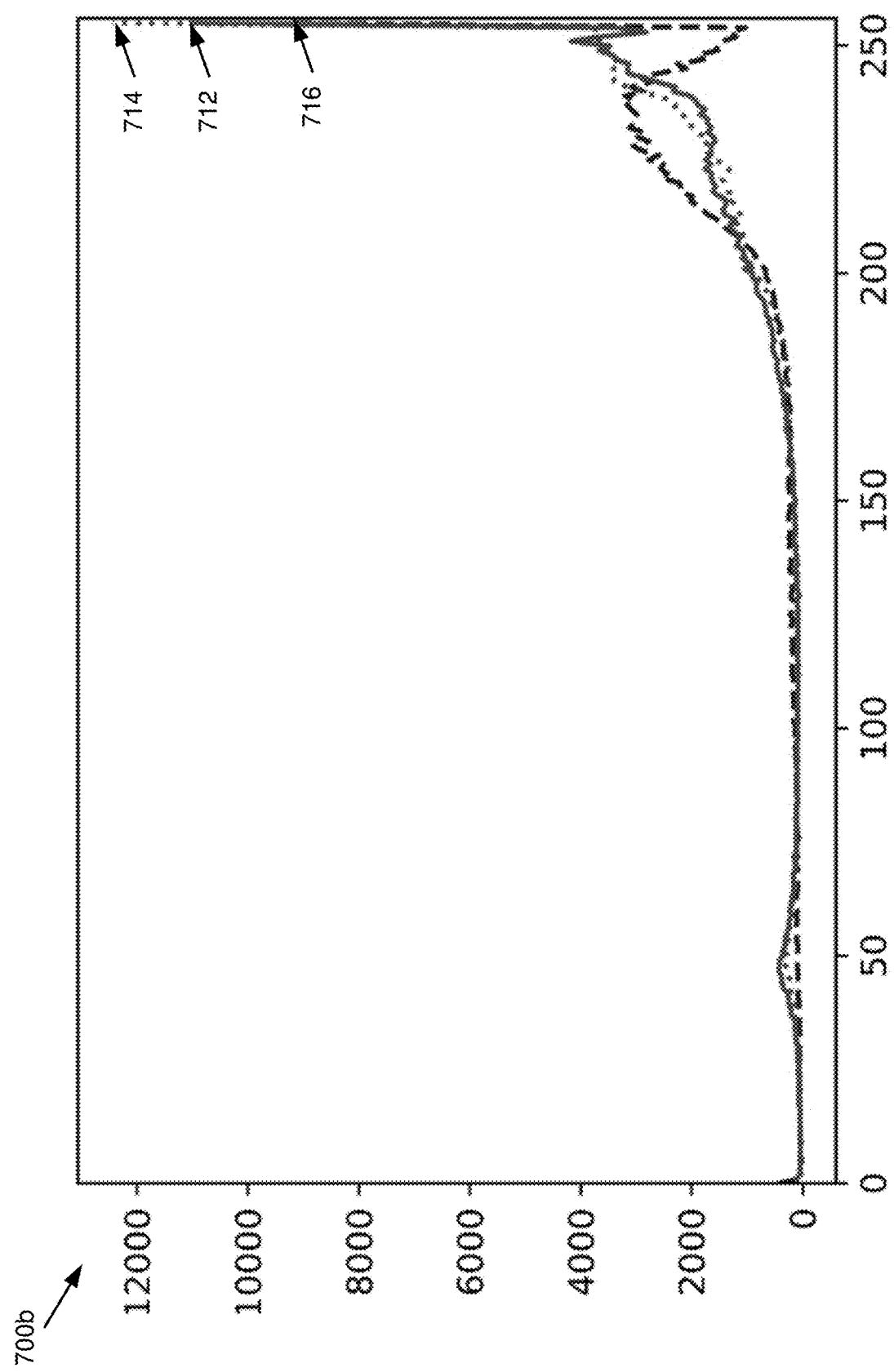
Figure 7C:
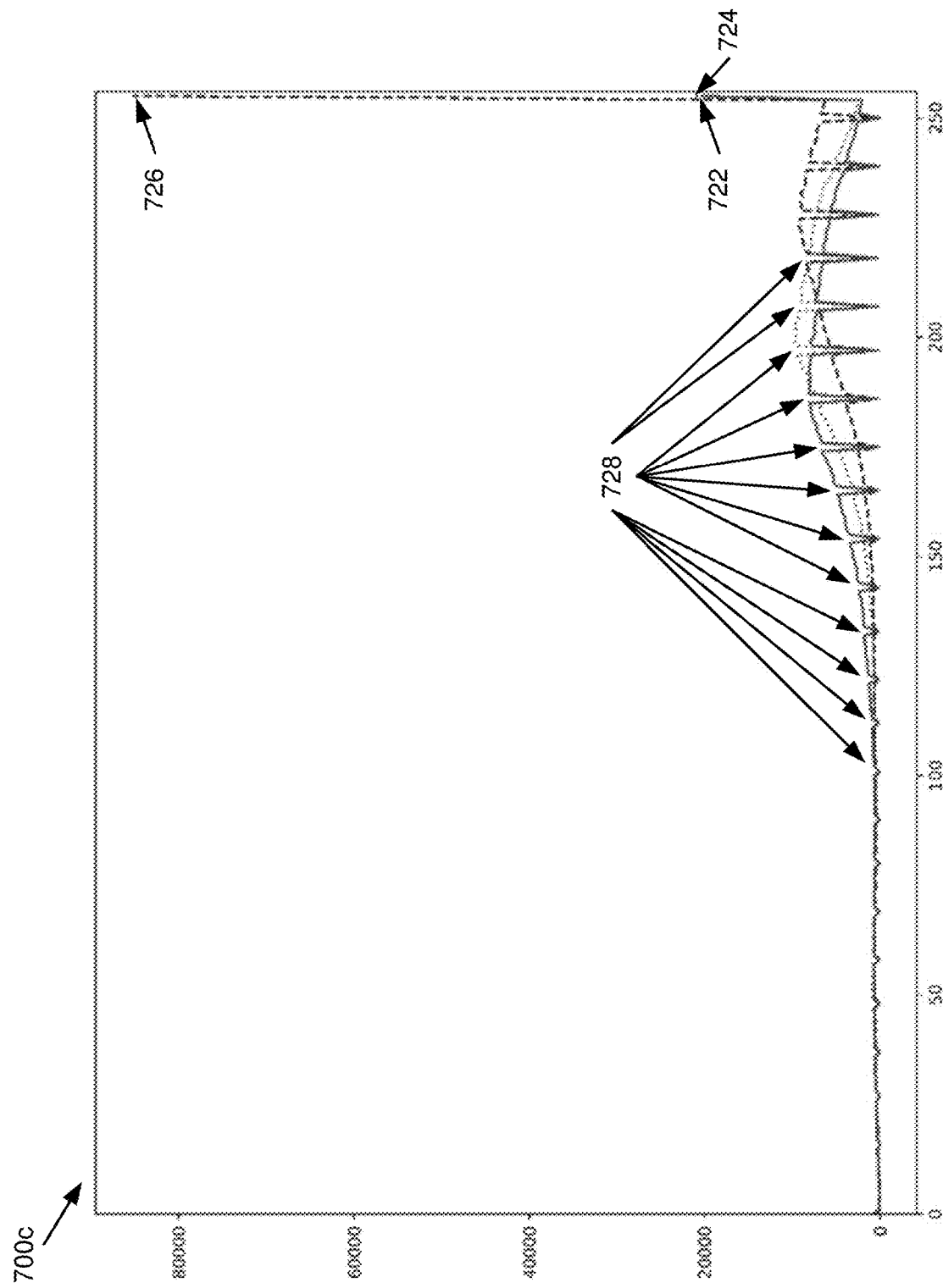

FIG. 7A-C illustrate example RGB color histograms 700a-c generated from three different synthetic images (not shown) in accordance with some implementations. Upon review of FIGS. 7A-C, certain characteristics are graphically apparent. For example, red peak 702 of FIG. 7A; red peak 712, green peak 714, and blue peak 716 of FIG. 7B; and red peak 722, green peak 724, and blue peak 726 of FIG. 7C, are very tall and narrow, when compared to the peaks of FIGS. 6A-C, with asymptotic, or near asymptotic, slopes to the zenith. As another example, referring to FIG. 7C, the histogram of all three RGB colors have periodic valleys, or troughs, down to zero, some of which are indicated by arrows 728. Examples of an anomaly indicative of a synthetic image include, but are not limited to, periodicity, asymptotic slopes, disproportionately tall and narrow peaks (e.g., exceeding a height to width ratio), or a combination thereof. However, it should be recognized that the foregoing are merely examples of anomalies indicative of synthetic generation that may be represented in a color histogram, and that others exist and are within the scope of this disclosure.

FIG. 8A-C illustrate examples of mean-subtracted contrast normalized coefficient distributions 800a-c generated from a non-synthetic, a partially synthetic, and a synthetic image, respectively, in accordance with some implementations.

FIG. 8A illustrates an example of a MSCN coefficient distribution 800a generated from a non-synthetically generated image (not shown). Upon review, the normal, or Gaussian, curve of the distribution is apparent in MSCN coefficient distribution 800a.

FIG. 8B illustrates an example of a MSCN coefficient distribution 800b generated from a partially synthetically generated image (not shown). A partially synthetic image includes a natural image (i.e., taken by a camera), which has been altered, whether by incorporating a portion of another natural image (e.g., a digital photo of the fraudster's face) or by synthetically modifying the image (e.g., using a text tool in a digital photo editor to modify a field). Upon review, it is apparent that the MSCN coefficient distribution 800b deviates from a normal, or Gaussian, curve. For example, because the synthetic portions introduce distortions into the MSCN coefficient distribution 800b, which deviate from the smooth curve illustrated in FIG. 8A.

FIG. 8C illustrates an example of a MSCN coefficient distribution 800c generated from a fully synthetically generated image (not shown). A fully synthetic image is an image absent a natural image. For example, an image produced by an algorithm, or software. Upon review, it is apparent that the MSCN coefficient distribution 800c deviates from a normal, or Gaussian, curve. For example, because the synthetic portions introduce distortions into the MSCN coefficient distribution 800b. For example, the synthetic nature of the image results in the sharp spike 812 and other points 814 into the MSCN coefficient distribution 800c, which deviate from the smooth curve illustrated in FIG. 8A.

In some implementations, the synthetic determiner 326 determines whether the image represented by the image attribute distribution is synthetic automatically, i.e., without human intervention. The type of analysis applied by the synthetic determiner 326 to determines whether the image represented by the image attribute distribution is synthetic may vary depending on the implementation. For example, the method of analysis may vary based on, but not limited to, one or more of a default, an image attribute distribution type, a user preference, a request, and a user selection. In some implementations, the synthetic determiner 326 may be communicatively coupled to receive an indication of the method of analysis from one or more of a user 112 (e.g., via client device 106), or an application (not shown), such as an application that performs an identification or an authentication, and via the network 102. Examples of types of analysis applied by the synthetic determiner 326 include, but are not limited to, one or more of machine learning algorithm and a normality test.

In some implementations, the synthetic determiner 326 automatically determines whether the image represented by the image attribute distribution is synthetic by applying a machine learning algorithm (not shown). The varieties of supervised, semi-supervised, and unsupervised machine learning algorithms are so numerous as to defy a complete list. Example algorithms include, but are not limited to, a decision tree; a gradient boosted tree; boosted stumps; a random forest; a support vector machine; a neural network; logistic regression (with regularization), linear regression (with regularization); stacking; a Markov model; support vector machines; and others. The synthetic determiner 326 is communicatively coupled to one or more of the memory 204, the data storage 214a, and the network 102 via communication unit 208 to obtain a machine learning algorithm.

In some implementations, a machine learning algorithm may be trained by the synthetic determiner 326 to determine whether a color histogram, or set of color histograms (e.g., RGB), represent a synthetic image. In some implementations, this determination is a classification (e.g., natural or synthetic) using labeled training data (e.g., color histograms labeled as synthetic or natural) and a supervised machine learning algorithm. In some implementations, this determination is a clustering (e.g., into two clusters-natural and synthetic) using unlabeled training data and an unsupervised machine learning algorithm. In some implementations, the MSCN coefficient distribution is generated for the image represented by a color histogram distribution, and analysis of the MSCN coefficient distribution is performed to determine whether the MSCN coefficient distribution is normal (natural) or not (synthetic), and the color histogram distribution is labeled accordingly, which may provide labels, or missing labels, for a supervised ML algorithm to be applied.

In some implementations, the synthetic determiner 326 automatically determines whether the image represented by the image attribute distribution is synthetic by applying a normality test (not shown). A normality test is a statistical test used determine whether a data set, represented by the image attribute distribution, is well-modeled by a normal distribution. In some implementations, when the synthetic determiner 326 determines that MSCN coefficient distribution is well-modeled by a normal distribution, the synthetic determiner 326 determines that the image represented by the MSCN coefficient distribution is natural, also occasionally referred to herein as non-synthetic, not synthetically generated, or similar. In some implementations, when the synthetic determiner 326 determines that MSCN coefficient distribution is not well-modeled by a normal distribution, the synthetic determiner 326 determines that the image represented by the MSCN coefficient distribution is synthetic also occasionally referred to herein as synthetically generated or similar.

It should be recognized that more than one type of image attribute distribution may be generated and used in series, in any order, or in parallel. For example, in one implementation, the MSCN coefficient distribution and RGB color histogram for an image may both be generated and analyzed. In another example, one of the MSCN coefficient distribution and RGB color histogram is generated and analyzed, and responsive to the image passing (or failing, depending on the implementation), the other image attribute distribution is generated and analyzed to confirm the prior result. In yet another example, one type of image attribute distribution is generated and analyzed for a full image, and a second type of image attribute distribution is generated and analyzed for components of the full image.

In some implementations, when the synthetic determiner 326 determines the image represented by the image attribute distribution is synthetic, the synthetic determiner 326 issues a rejection. In some implementations, the rejection triggers a failure of an identification, an authentication, or both. In some implementations, the synthetic determiner 326 is communicatively coupled to send the rejection to one or more of an application (not shown), across the network 102, and the image controller 322. In some implementations, the image controller 322 determines the next image responsive to receiving the rejection. For example, the image controller 322 determines the next image is a component of the image for which the rejection is received. In another example, the image controller 322 determines the next image is the next image in a sequence of images for analysis.

EXAMPLE METHODS

Figure 4:
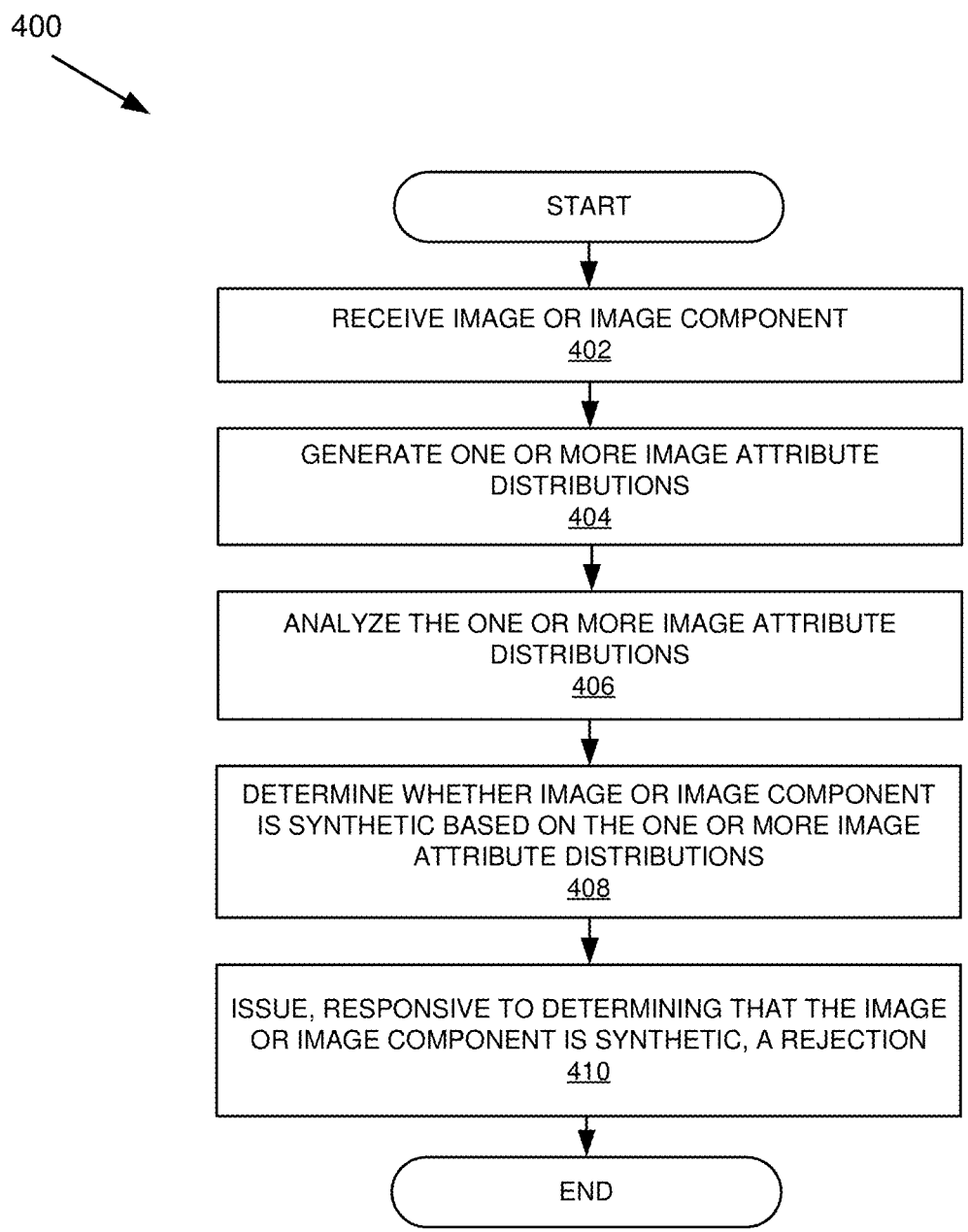
FIG. 4 is a flowchart of an example method for synthetic image detection in accordance with some implementations.
Figure 5:
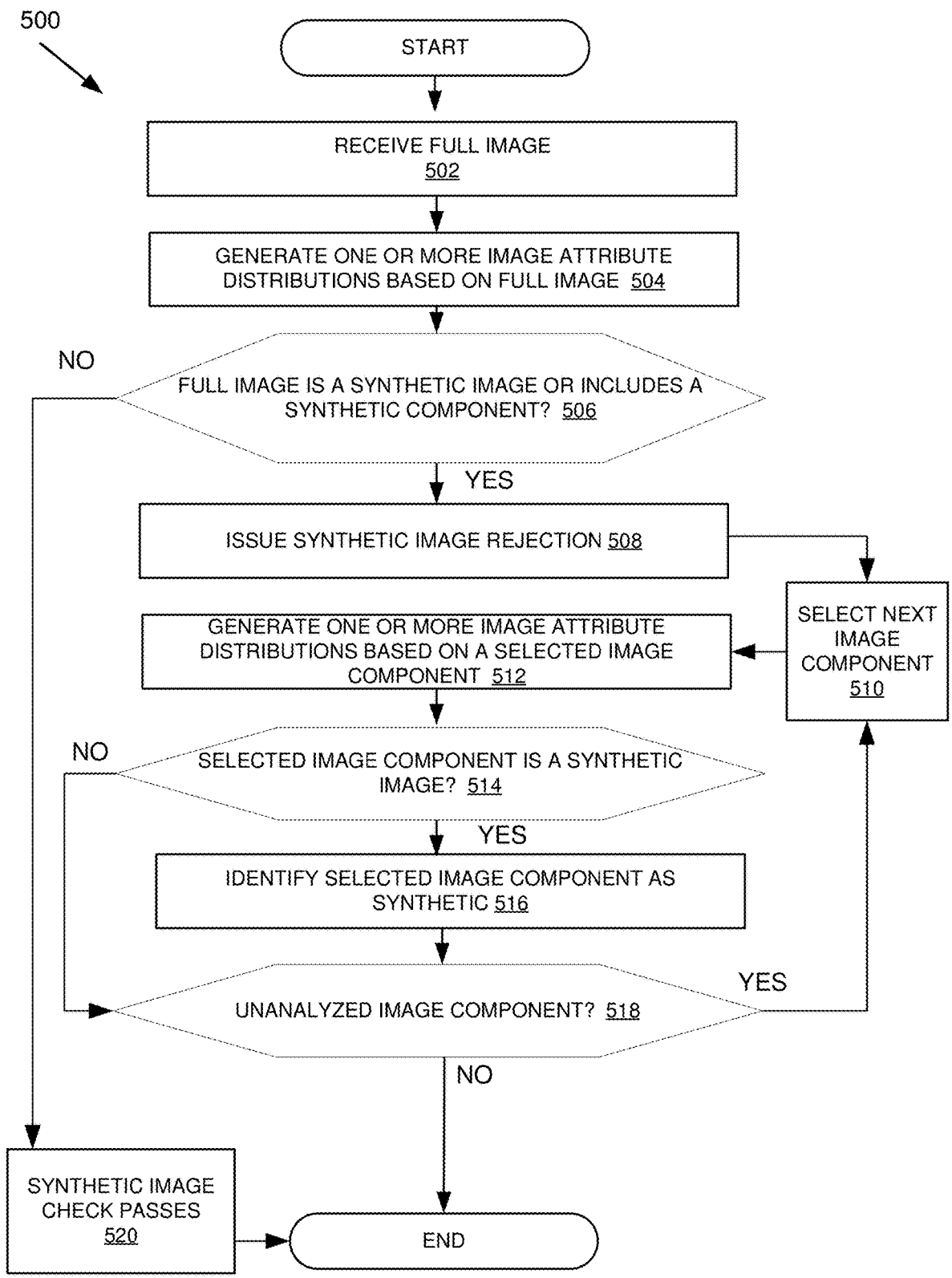
FIG. 5 is a flowchart of an example method for synthetic image detection in accordance with some implementations.

FIGS. 4 and 5 are flowcharts of example methods that may, in accordance with some implementations, be performed by the systems described above with reference to FIGS. 1-3. The methods 400 and 500 of FIGS. 4 and 5 are provided for illustrative purposes, and it should be understood that many variations exist and are within the scope of the disclosure herein.

FIG. 4 is a flowchart of an example method 400 for detecting synthetically generate images in accordance with some implementations. The method 400 begins at block 402. At block 402, the image attribute distribution generator 324 receives an image or an image component. At block 404, the image attribute distribution generator 324 generates one or more image attribute distributions. At block 406, the synthetic determiner 326 analyzes the one or more attribute distributions. At block 408, the synthetic determiner 326 determines whether the image or image component, received at block 402, is synthetic based on one or more image attribute distributions generated at block 404. At block 410, the synthetic determiner 326 issues, responsive to determining that the image or image component is synthetic at block 408, a rejection, and the method 400 ends.

FIG. 5 is a flowchart of an example method 500 for detecting synthetically generate images in accordance with some implementations. The method 500 begins at block 502. At block 502, the image attribute distribution generator 324 receives a full image. At block 504, the image attribute distribution generator 324 generates one or more image attribute distributions based on the full image. At block 506, the synthetic determiner 326 determines whether the full image is fully synthetic or includes a synthetic component (i.e., partially synthetic) based on the one or more attribute distributions generated at block 504. When the synthetic determiner 326 determines that the image is not a synthetic and does not include a synthetic component (506—NO), the method 500 continues at block 520, where the synthetic image check is passed, and the method 500 ends. When the synthetic determiner 326 determines that the image is synthetic or includes a synthetic component (506—Yes), the method 500 continues at block 508. At block 508, the synthetic determiner 326 issues a synthetic image rejection.

In some implementations, whether the image is fully synthetic or partially synthetic (e.g., even a small component in the image is synthetic), the image is determined as synthetically generated at block 506 and the rejection is issued at 508. In some implementations, blocks 510-518 are optional and may be omitted. For example, in some implementations, determining whether the full image is fully synthetic or whether a component, or which component, in the full image is synthetic may not be information that is used, so the method 500 ends after block 508. In some implementations, determining whether the full image is fully synthetic or whether a component, or which component, in the full image is synthetic may be desirable and useable information, so the method 500 continues at block 510. For example, in some implementations, determining which component(s) or how many components may be desirable and affect whether a rejection is issued, e.g., only certain synthetic components result in a rejection, a threshold must be satisfied (e.g., a certain percent of components must be synthetic, or weighted values are assigned to components and the threshold is a sum of the weighted values of the components determined to be synthetic), so the method 500 continues at block 510

At block 510, the image controller 322 selects an image component for analysis. At block 512, the synthetic the image attribute distribution generator 324 generates one or more image attribute distributions based on a selected image component. At block 514, the synthetic determiner 326 determines whether the selected image component is a synthetic image based on the one or more attribute distributions generated at block 512. When the synthetic determiner 326 determines that the image component is not synthetic (514—NO), the method 500 continues at block 518. When the synthetic determiner 326 determines that the image component is synthetic (514—Yes), the synthetic determiner 326 identifies the image component as synthetic, at block 516, and the method continues at block 518.

At block 518, the synthetic determiner 326 determines whether there are unanalyzed image components. When an unanalyzed image component exists (518—YES), the method 500 continues at block 510. At block 510, the image controller 322 selects the next image component, and the method continues at block 512. Blocks 510-518 may be repeated until no unanalyzed image component remains (518—NO). When there is no unanalyzed image component (518—NO), the method 500 ends.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer implemented method comprising:
receiving a first image;
generating a first image attribute distribution describing a distribution of values that are based on a first visual attribute associated with the first image, wherein the first visual attribute is at least partially defined by a plurality of pixel values associated with a first set of pixels comprising the first image;
determining, based on the first image attribute distribution, whether the first image is synthetically generated;
determining, based on the first image attribute distribution, that the first image is synthetically generated;
obtaining, responsive to determining that the first image is synthetically generated, a second image, wherein the second image represents a component within the first image;
generating, based on the second image, a second image attribute distribution of pixel values that are based on the first visual attribute associated with the component represented in the second image;
determining, based on the second image attribute distribution, whether the second image is synthetically generated; and
issuing, responsive to determining that the first image is synthetically generated, a rejection; and
identifying, responsive to determining that the second image is synthetically generated, the component as a synthetically component.

2. The computer implemented method of claim 1, wherein the first visual attribute includes contrast, wherein the first image attribute distribution includes a mean-subtracted contrast normalized coefficient distribution, and wherein determining whether the first image is synthetically generated includes applying a normality test to determine whether the mean-subtracted contrast normalized coefficient distribution is normal.

3. The computer implemented method of claim 1, wherein the first visual attribute includes a color, wherein the first image attribute distribution includes a color histogram, and wherein determining whether the first image is synthetically generated applies a machine learning algorithm to determine whether an anomaly is present in the color histogram.

4. The computer implemented method of claim 1, wherein determining whether the first image is synthetically generated, includes applying a machine learning algorithm.

5. The computer implemented method of claim 1, wherein determining whether the first image is synthetically generated, includes determining whether the first image is partially synthetic or fully synthetic.

6. The computer implemented method of claim 1 further comprising:
receiving a third image, wherein the third image is another component of the first image distinct from the component represented in the second image;
generating, based on the third image, a third image attribute distribution of pixel values that are based on the first visual attribute associated with the another component represented in the third image and the first image; and
determining, based on the third image attribute distribution, whether the another component represented in the third image is a synthetically generated component.

7. The computer implemented method of claim 1, wherein the first image is a first image component of a larger image.

8. The computer implemented method of claim 1, wherein the first image is a component of a larger image, and the first image includes an area of interest within the larger image and a margin beyond the area of interest in one or more dimensions.

9. The computer implemented method of claim 1, wherein the rejection triggers one or more of a failure of identity confirmation and failure of authentication.

10. The method of claim 1, wherein the first image includes one or more of a face and text associated with a field in a document.

11. A system comprising:
a processor; and
a memory, the memory storing instructions that, when executed by the processor, cause the system to:
receive a first image;
generate a first image attribute distribution describing a distribution of values that are based on a first visual attribute associated with the first image, wherein the first visual attribute is at least partially defined by a plurality of pixel values associated with a first set of pixels comprising the first image;
determine, based on the first image attribute distribution, whether the first image is synthetically generated;
determine, based on the first image attribute distribution, that the first image is synthetically generated;
obtain, responsive to determining that the first image is synthetically generated, a second image, wherein the second image represents a component within the first image;
generate, based on the second image, a second image attribute distribution of pixel values that are based on the first visual attribute associated with the component represented in the second image; and
determine, based on the second image attribute distribution, whether the second image is synthetically generated; and
issue, responsive to determining that the first image is synthetically generated, a rejection.

12. The system of claim 11, wherein the first visual attribute includes contrast, wherein the first image attribute distribution includes a mean-subtracted contrast normalized coefficient distribution, and wherein determining whether the first image is synthetically generated includes applying a normality test to determine whether the mean-subtracted contrast normalized coefficient distribution is normal.

13. The system of claim 11, wherein the first visual attribute includes a color, wherein the first image attribute distribution includes a color histogram, and wherein determining whether the first image is synthetically generated applies a machine learning algorithm to determine whether an anomaly is present in the color histogram.

14. The system of claim 11, wherein determining whether the first image is synthetically generated, includes applying a machine learning algorithm.

15. The system of claim 11, wherein determining whether the first image is synthetically generated, includes determining whether the first image is partially synthetic or fully synthetic.

16. The system of claim 11, the memory further storing instructions that, when executed by the processor, cause the system to:
receive a third image, wherein the third image is another component of the first image distinct from the component represented in the second image;
generate, based on the third image, a third image attribute distribution of pixel values that are based on the first visual attribute associated with the another component represented in the third image and the first image; and determine, based on the third image attribute distribution, whether the another component represented in the third image is a synthetically generated component.

17. The system of claim 11, wherein the first image is a first image component of a larger image.

18. The system of claim 11, wherein the first image is a component of a larger image, and the first image includes an area of interest within the larger image and a margin beyond the area of interest in one or more dimensions.

19. The system of claim 11, wherein the rejection triggers one or more of a failure of identity confirmation and failure of authentication.

20. The system of claim 11, wherein the first image includes one or more of a face and text associated with a field in a document.

\* \* \* \* \*